Figures 1, 2, 3, 4:
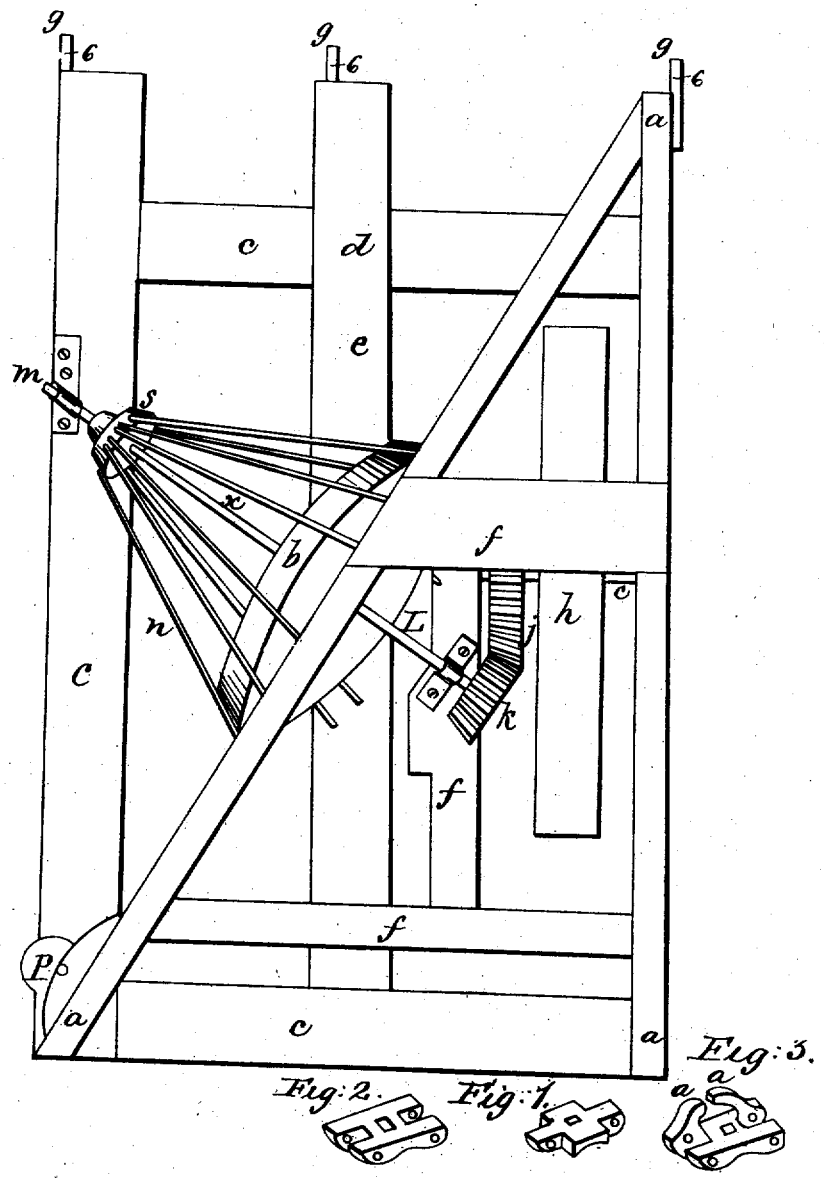

6 Sheets—Sheet 1.
J. L. HARDEMAN.
Flax Harvester.
No. 1,200.
Reissued June 18, 1861.
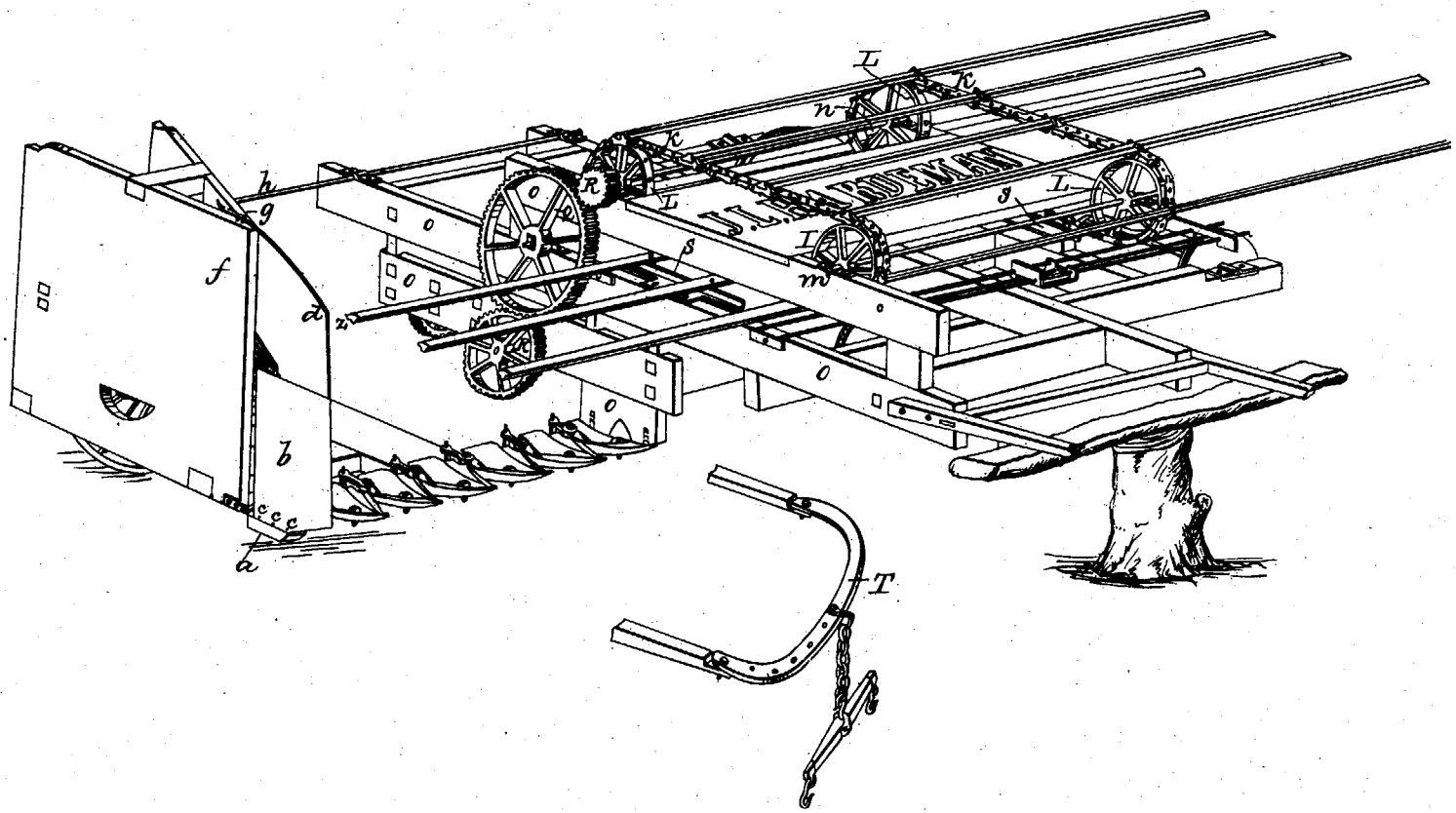

J. L. HARDEMAN.
Flax Harvester.
No. 1,200.
Reissued June 18, 1861.
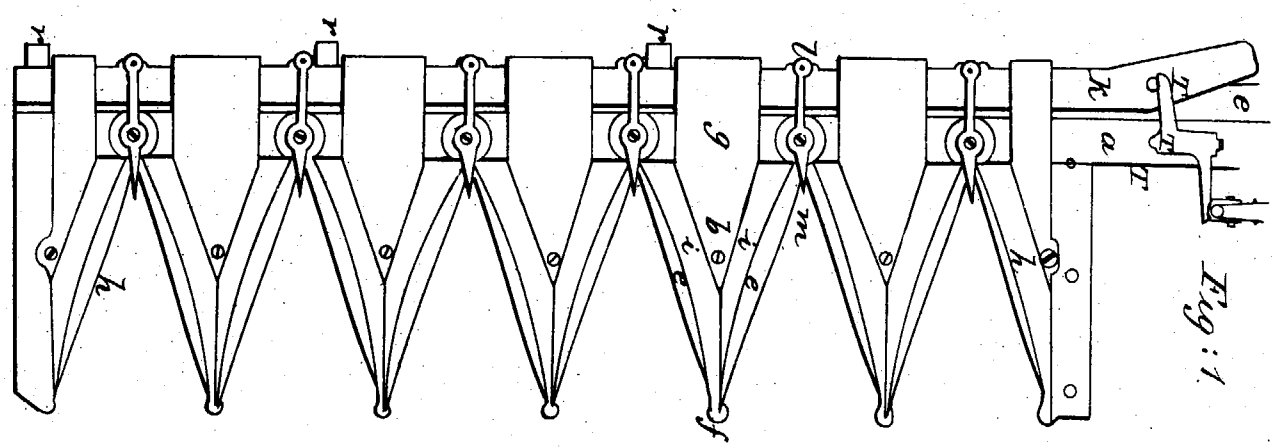
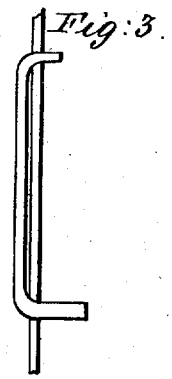
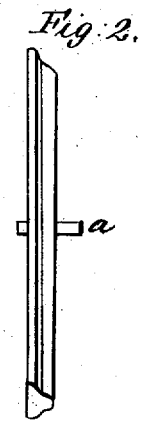
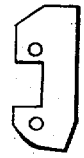
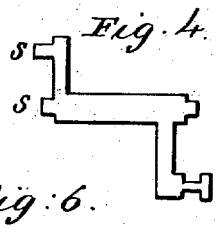
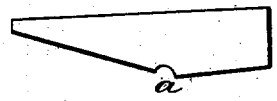
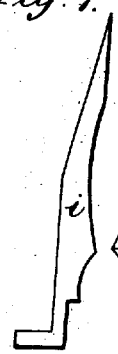
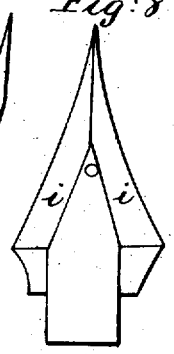

6 Sheets—Sheet 3.

J. L. HARDEMAN.

Flax Harvester.

No. 1,200.

Reissued June 18, 1861.

6 Sheets—Sheet 4.
J. L. HARDEMAN.
Flax Harvester.
No. 1,200.
Reissued June 18, 1861.
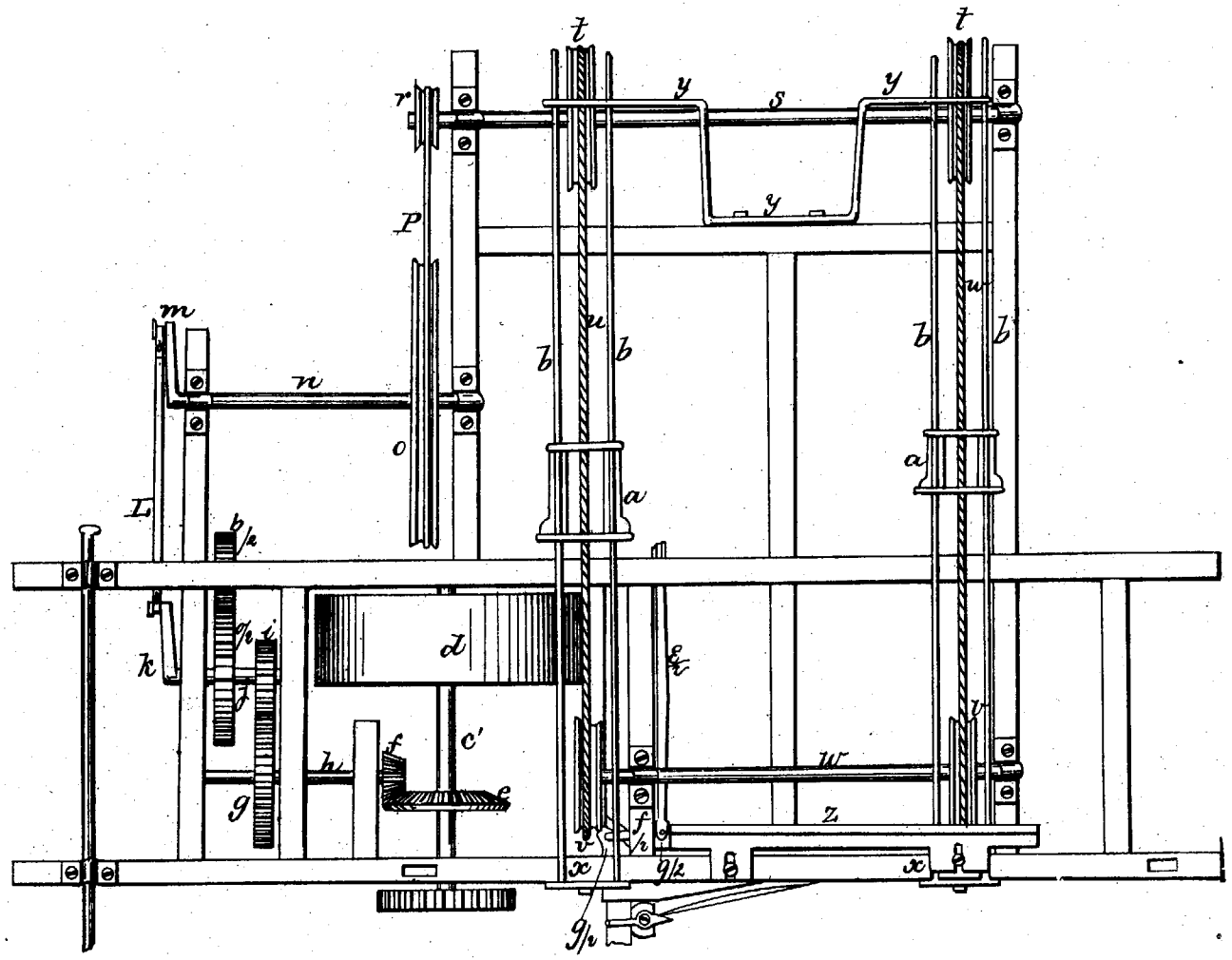

6 Sheets—Sheet 5.
J. L. HARDEMAN.
Flax Harvester.
No. 1,200.
Reissued June 18, 1861
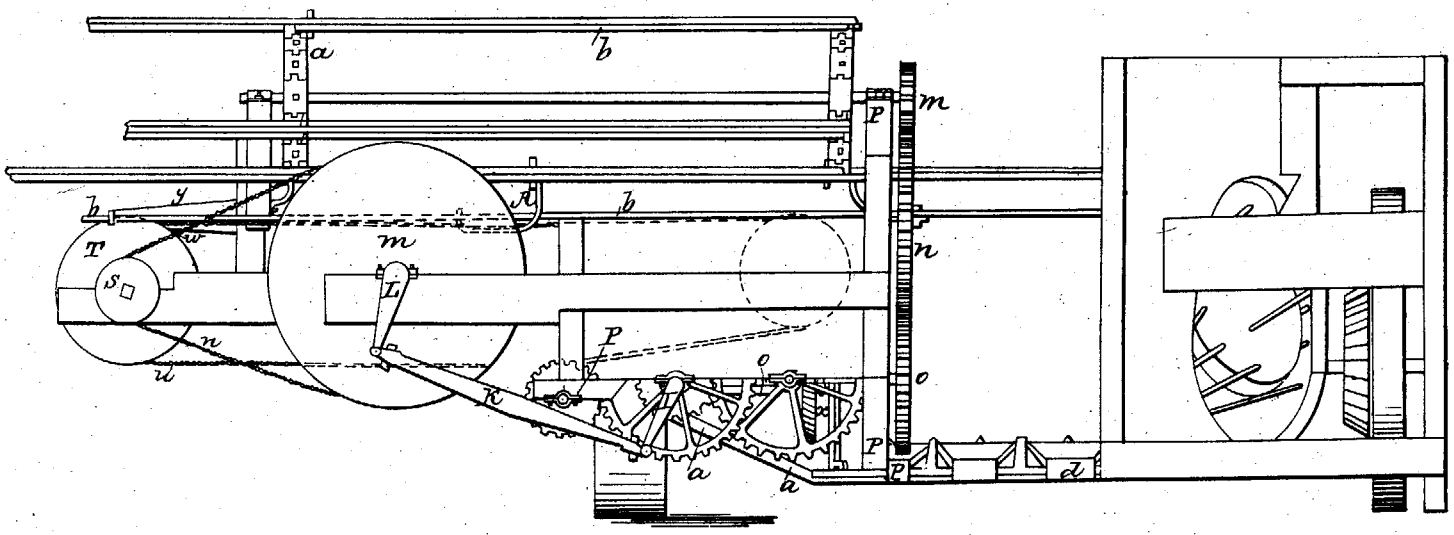

6 Sheets—Sheet 6.
J. L. HARDEMAN.
Flax Harvester.
No. 1,200.
Reissued June 18, 1861.
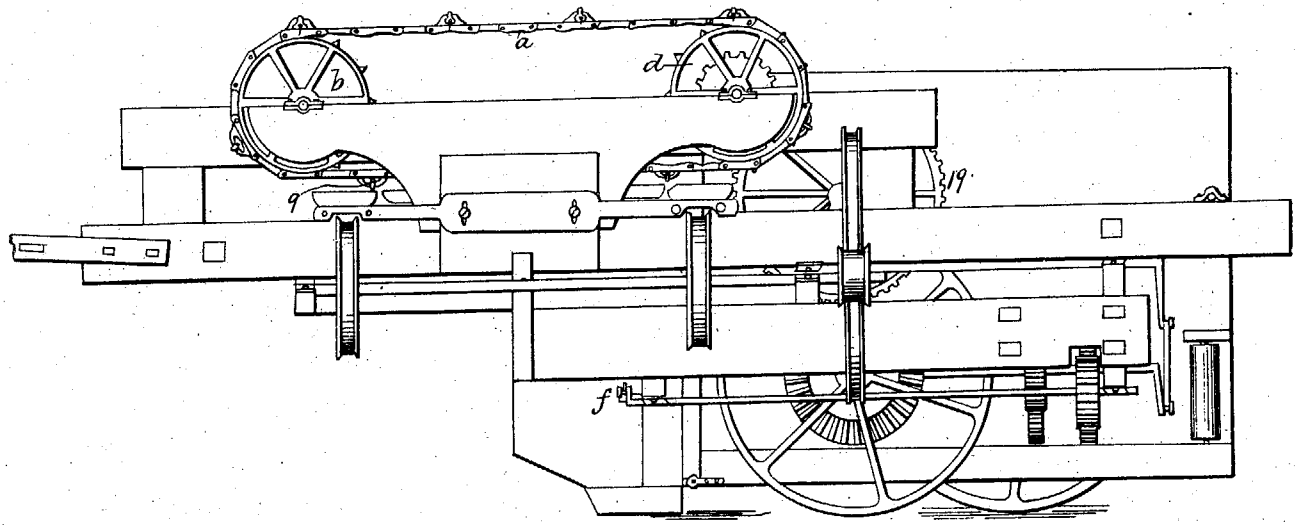

UNITED STATES PATENT OFFICE.

WM. N. WHITELEY, OF SPRINGFIELD, OHIO, ASSIGNEE, BY MESNE ASSIGNMENTS, OF JOHN LOCKE HARDEMAN, DECEASED.

IMPROVEMENT IN MACHINES FOR CUTTING HEMP.

Specification forming part of Letters Patent No. 7,568, dated August 20, 1850; Reissue No. 1,200, dated June 18, 1861.

DIVISION A.

*To all whom it may concern:*

Be it known that JOHN LOCKE HARDEMAN, of Saline county, near Arrow Rock, and State of Missouri, invented a new and Improved Mode of Cutting Hemp, Millet, and other Grain, of which the following is a full, clear, and exact description, reference being had to the accompanying drawings, forming part of this specification, by plates, figures, and letters.

The cutting is performed by means of thin steel blades twelve inches long and two and a half inches wide. Their form (see Plate 2, Figure 6,) is straight and sharp on their cutting-edges, two and a half inches wide for one-half their length, then sloped toward their cutting-edges, leaving their other ends half an inch wide and one-eighth of an inch thick on the backs. From their back at their center is cut a semicircle, *a*, Fig. 6, Plate 2, to admit of the screw *b*, Fig. 1, Plate 2, passing between the backs of the blades *c c*, Fig. 1, Plate 2, when placed upon the arm *d*, Fig. 1, Plate 2, in which place they occupy a space of eight inches on the arm and terminate together in a point. The arm *d*, Fig. 1, Plate 2, is constructed of cast-iron, four feet long, four inches wide, and two inches thick, having a rabbet, *e*, Fig. 1, Plate 2, cut from the upper and back corner, two inches wide and three-fourths of an inch deep. On the front side of this arm *d*, Fig. 1, Plate 2, are seven projecting points, *f*, Fig. 1, Plate 2, to receive the blades *c c*, Fig. 1, Plate 2, which projecting points are troughed or channeled, so as to form, with the cap *g*, Fig. 1, Plate 2, and Fig. 8, Plate 2, jaws, by which the blades *c c*, Fig. 1, Plate 2, are firmly held in their position at an angle of about forty degrees from a level, which is the position of the blade in the common hemp-cradle when cutting, the only difference being that my blades are in pairs, back to back, in a V form. That one of said points which is nearest to the main frame O is secured thereto, as clearly illustrated. At each end of the arm there are single blades *h h*, Fig. 1, Plate 2, right and left. The arm is so placed as to be at right angles with the track of the horses, and extends four feet into the standing hemp, &c., on the right-hand side, where it is supported by a slide, *a*, Plate 1, which supports it two inches above the ground. It is also extended two and a half feet on the left hand in an upward direction, *d d*, Plate 5, across and into the frame-work P P, Plate 5, to which it is attached, and is a plain bar without rabbet or points. The caps *g*, Fig. 1, Plate 2, and Plate 2, Figs. 7 and 8, are of cast-iron, formed so as to confine the blades *c c*, Fig. 1, Plate 2, by being pressed firmly down upon them, and fastened by screws *b*, Fig. 1, Plate 2, the angle of the sides *i i*, Plate 2, Figs. 1 and 8, corresponding to the sides of the projecting points *f*, Plate 2, Fig. 1, the two forming jaws in which the blades are held as in a vise. The lower surface of the cap being the counterpart of the upper face of the projecting points, Plate 2, Fig. 8, represents the upper surface of the cap, and Fig. 7, Plate 2, a section of the same cut longitudinally and vertically, exhibiting the heel or claw *j*, Plate 2, Fig. 7, which passes over and behind the arm *d*, Plate 2, Fig. 1, and forms, with the rabbet *e*, Plate 2, Fig. 1, a covered channel for a sliding bar, *k*, Plate 2, Fig. 1, as much over four feet long as the rocking shaft *x*, Plate 5 and Plate 2, Fig. 1, is from the outside of the first standing knife or cutter, one inch wide and half an inch thick, having six projecting points, *l*, Plate 2, Fig. 1, elevated so as to work the cleaners or cutters *m*, Plate 2, Fig. 1. The cleaners or cutters are small knives, sharp on both sides, terminating in a point. The blades are two inches long, and one and a quarter wide at the widest part. The remainder of the cleaner or cutter is a shank or handle four inches long, having a hole through the end where it is attached to the projecting points *l*, Plate 2, Fig. 1, of the bar *k*, Plate 2, Fig. 1. There is also a hole through the widest part through which passes the screw *n*, Plate 2, Fig. 1, into the arm *d*, Plate 2, Fig. 1, and on which it works like a moving shear-blade over the junction of the stationary blades *e*, Plate 2, Fig. 6, which form the lower part of the shears. To the right-hand end of the arm is fastenened by rivets *c c c*, Plate 1, the separator, which is made of a sheet-iron plate, *v*, Plate 1, one foot four inches wide, two feet high, having a strong wire or rod, *d*, Plate 1, three-eighths of an inch in diameter in the front edge, rising two feet and extending upward and backward. The motion of the driving-wheel *d* passes through the wheels *e f g i* to the shaft *j*, Plate 4, upon which there is a wheel, $a^2$, Plate 4, one foot in diameter, thirty-six cogs, matching into a pinion, $b^2$, Plate 4, of eighteen cogs, upon a shaft, E, Plate 6, three feet four inches long, one and a quarter inch square, with a crank, *f*, Plate 6, upon the forward end, two inches long, which works a pitman, $E^2$, Plate 4, twenty-two inches long, connected with a rocking shaft, Plate 2, Fig. 4, T T, Plate 2, Fig. 1, which is shown in perspective, and X, Plate 5, which is under the cross-timbers at $f^2$, Plate 4, the arms shown right and left two inches long, the lower one connected with the sliding bar *k*, Plate 2, and the arm *d*, Plate 2, by its journals *s s*, Fig. 4, Plate 2, and at T T, Plate 2, Fig. 1, by which the cleaners or cutters are worked.

The frame-work is made of solid oak timber two inches thick, and joined as in the plates, which are on a scale of two inches to the foot, except Plate 4, which is one and one-third inch to the foot.

The machine is drawn by two horses tandem, the leading horse being attached to a bow, T, Plate 1, connecting the points of the shafts in front of the breast of the other horse, and is so constructed as to equalize the resistance of the arm or finger-bar, which is all at one side thereof, by means of a movable clevis, the driving-wheel being placed as far as possible to the left for the same purpose.

It will be observed that the above-described invention or improvements contain some of the essential elements of the best mowing-machines now in use—as, for instance, it will be seen by reference to Plate 1 of the drawings, that the invention made the subject of this division has most of the main ground-wheel frame far above the ground, and also that the part of it which comes near the ground rests on the first projecting point, or that one which is at the stubble side of the machine; a cutting apparatus the knives or cutters of which are driven by a crank and pitman; a finger-bar which is but four inches wide, (whereby the crop is permitted to fall to the ground as fast as cut,) with a bend in it near the heel of the cutter-bar, as seen at Plate 5, which enables that part of the bar between the bend and the vertical plane in which the main ground and driving wheel moves to pass over the cross-cut at a preceding round of the machine without dragging it forward when that part of the bar which has the cutting parts on it runs on or near the ground; a separator on the end of the finger-bar for separating that to be cut from that to be left standing, and a projecting point or finger, *f*, as seen at Plate 1 of the drawings, under the lower edge of the lowest part of the wheel-frame, which extends forward from the front edge of the arm or finger-bar, and is as low as any part thereof, the under side of which is sloped upward and forward from near the front edge of the arm or finger-bar to that part of the wheel-frame which rests on it, and to which part of the wheel-frame it is firmly secured, as seen at Plate 1 of the drawings, by which manner of construction and connection of the arm or finger-bar of the wheel-frame said projecting point performs five separate and distinct functions or offices, viz: first, the projecting point serves as a drawing-brace, through which the draft of the team is communicated to the arm or finger-bar for retaining it against lateral strain; secondly, as a strong support for preventing the front edge of the finger-bar and dividing points or fingers from being twisted downward; thirdly, its cutting-edge nearest the vibrating cutters forms a fixed edge, which sustains and inclines the outside edge of the outside strip of the standing crop toward the vibrating cutter; fourthly, it forms the fixed support and shear edge over which the end cutter vibrates or plays; fifthly, the upward incline of its under side from a point as low as the finger-bar, and near the front edge thereof, enables that part of the arm or finger-bar from which it projects to pass over the cut crop which the point passes over without dragging it forward—a thing which is a great desideratum in harvesting-machines from the finger-bar and separator of which the cut crop falls to the ground as fast as cut, and which pass over the cut crop when cutting a succeeding round.

It will be observed that by means of the movable clevis hereinbefore described the point of draft can be shifted to suit the different degrees of resistance presented by different crops to the cutting apparatus, and the machine thereby kept in a perfectly balanced condition relative to the line of draft.

It will be observed that the drawings hereinbefore referred to show the entire original invention, the other parts of which not described in this division are in divisions B and C, filed simultaneously with this division.

Having thus fully described the construction and operation of that part of the invention made the subject of this patent, what I claim as the invention of the said JOHN LOCKE HARDEMAN, deceased, is—

1. In combination with the arm or finger-bar *d* and main frame *o*, when constructed substantially as described, the projecting point *f*, constructed and connected as shown, for the purposes specified.

2. In combination with the shafts or their equivalents and a cutting apparatus projecting out from one side of the main frame, the adjustable clevis or its equivalent arranged for shifting the point of draft, for the purpose hereinbefore specified, substantially as described.

WM. N. WHITELEY.

Witnesses:
SOL J. HOUCK,
REUBEN MILLER.